Feb. 5, 1929.
A. E. SCHEIN
1,700,856
THRUST BEARING
Filed Oct. 8, 1924
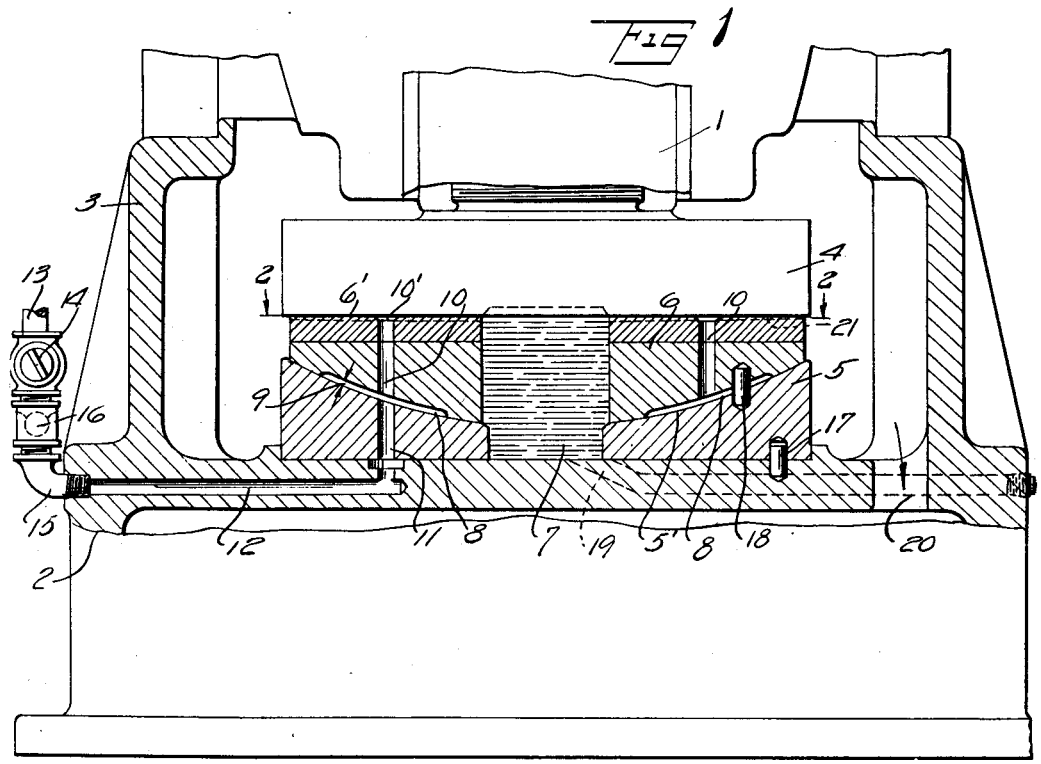
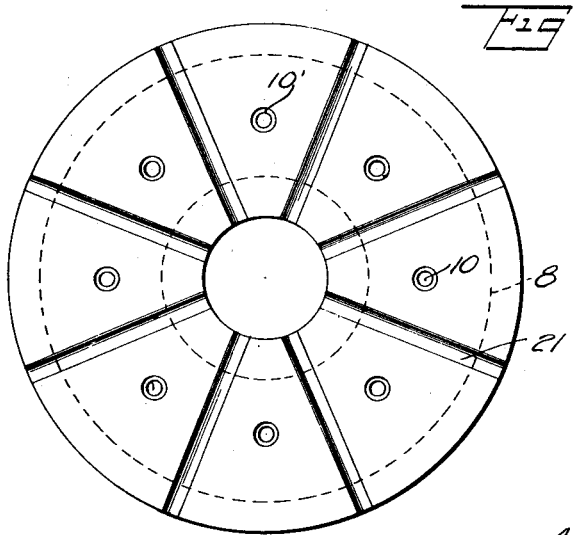
INVENTOR
Alexander E. Schein
BY
ATTORNEY Patented Feb. 5, 1929.

1,700,856

UNITED STATES PATENT OFFICE.

ALEXANDER E. SCHEIN, OF FLUSHING, NEW YORK, ASSIGNOR TO THE SPERRY GYROSCOPE COMPANY, OF BROOKLYN, NEW YORK, A CORPORATION OF NEW YORK.

THRUST BEARING.

Application filed October 8, 1924. Serial No. 742,288.

This invention relates to thrust bearings.

The object of the invention is a self alining thrust bearing unit embodying novel principles of construction and operation whereby a thorough lubrication of certain of the relatively adjustable parts and a substantial reduction in the frictional resistance therebetween are effected. My invention relates particularly to that type of bearing structure including an adjustable friction bearing member disposed intermediate a relatively movable thrust plate and a bearing retaining member, and resides in a construction and organization such as to promote the thorough lubrication of the relatively adjustable retaining and bearing members, both at starting and in normal operation and to substantially lessen the frictional resistance therebetween during normal operation. A further object is a simplified structure and arrangement for lubricating the friction bearing surfaces at starting. The invention has especial adaptation to the type of babbitt thrust bearings claimed in my co-pending applications Serial No. 537,709, filed February 20, 1922, and Serial No. 741,541, filed October 4, 1924.

For a better understanding of the invention, reference may be had to the accompanying drawings illustrating one embodiment thereof, wherein—

Fig. 1 is a cross section of a vertical thrust bearing including an embodiment of my invention, and Fig. 2 is a plan view looking down upon one of the bearing elements removed from the structure.

Referring to the drawings, I have illustrated somewhat conventionally a vertical shaft 1 of a power apparatus with a thrust bearing structure embodying my invention disposed intermediate therebetween and a base 2. The base 2 is provided with a suitable housing 3 surrounding the lower end of the shaft 1 and the lower end of the shaft is provided with a suitable thrust plate 4. A bearing retaining member 5 is suitably anchored upon the base 2 and within the housing 3 underneath the lower end of the shaft 1. A bearing member 6, including the bearing surface 6', is interposed between the thrust plate 4 and the retaining member 5, the friction bearing portion 6' of the bearing member being of any suitable character and metal for this purpose. The retaining member 5 is provided with a concave spherical bearing surface 5' on its side towards the thrust plate 4 and the bearing member 6 is provided with a cooperating convex spherical surface abutting against the spherical surface 5' of the retaining member 5. The retaining member 5 and the bearing member 6 in the particular embodiment shown are of annular form to provide an oil chamber 7 in the center just below the end of the shaft 1. By means of these cooperating spherically formed surfaces of the members 5 and 6 the latter is permitted to partake of compensating adjustments corresponding to the alinement of the shaft 1. I have provided between the retaining member 5 and the bearing member 6 an oil pressure and distributing chamber 8, this chamber being of very small depth (9) but of substantial width, and in this particular embodiment I have illustrated this chamber 8 as being formed by milling out the spherical bearing surface of the member 6 to the depth 9 of the chamber. I also provide the bearing member 6 with a plurality of distributing channels 10 leading from the chamber 8 to the friction bearing surface between the thrust plate 4 and the friction member 6 so as to effect free communication between the friction bearing surface and the oil pressure chamber 8. If desired the upper ends of the channels 10 may be slightly beveled as indicated at 10'. For supplying lubricant directly to the chamber 8 and from there through the channels 10 to the friction bearing surface from an outside source, as for example at starting, I have provided a channel 11 leading through the retaining member 5 with its outlet leading into the chamber 8 and communicating at its other end with an inlet channel 12 which is formed in the base member 2. A lubricant supply pipe is indicated at 13 with a suitable controlling or shut-off valve 14 disposed therein and leading downwardly to an elbow 15 screw-threadedly attached to the intake end of the channel or passage 12. A check valve 16 is provided in a fitting between the elbow 15 and the valve 14 for the purpose of preventing the reversal of oil flow. The retaining member 5 may be fixed to the base 2 to prevent movement in any suitable manner, as for example by means of the dowel pin connection or connections 17, only one of which is illustrated in the drawing. A similar dowel connection 18 may be provided between the members 5 and 6 to prevent relative rotation, but of sufficient looseness to permit of the slight pivotal compensating adjustments necessary. An intake 19 is indicated for supply of oil during normal operation and an outlet is indicated at 20. The friction bearing surface of the member 6 is provided with the radially disposed oil feeding and distributing grooves 21.

The operation of the structure described is as follows: At starting from rest the valve 14 may be opened to permit a lubricant to be supplied under pressure through the passages 11 and 12 into the chamber 8 and from thence through the passages 10 to the friction bearing surface between the thrust plate 4 and the bearing member 6. This results in the thorough lubrication of both the relatively adjustable contact surfaces between the members 5 and 6 and the friction bearing surface between the member 6 and the thrust plate 4 with a single supply pump, a film of oil being thereby formed between these abutting surfaces prior to starting with a consequent minimum of starting friction. After starting the valve 14 may be closed, which, together with the check valve 16, assures a tight seal of the chamber 8 and its communicating passages 10, 11, 12 against the outside. During normal operation, the pressure of the oil film between the thrust plate 4 and the bearing member 6 is transmitted to the oil contained in the chamber 8 through the medium of any one or all of the oil filled passages 10, so that the oil therein exerts an upward pressure counter to the weight of the shaft 1 and its carried parts whose value depends upon the effective area of the upper wall of the chamber 8, including the area of the passages 10 themselves. Such counter pressure is equal to the product of the oil film pressure and the effective area, and by properly proportioning such area, the contact surfaces between the members 5 and 6 may be relieved of a substantial portion of the weight of the power apparatus. The passages 10 and chamber 8 are maintained full of lubricant by the continual feeding thereto by the oil film notwithstanding the small leakages which may take place between the contacting surfaces of members 5 and 6. The bearing member 6, therefore, operates more or less as a sort of floating member upon the layer of oil formed by the chamber 8, resulting in a more efficient lubrication and a lessening of the adjustable contact resistance with a consequent reduction in the wear of the relatively adjustable parts.

It is understood that at starting the multiplicity of passages 10 serve to establish oil films for all the surfaces between the oil feeding grooves 21, while during normal operation any one of said passages functions to transmit the oil film pressure to the chamber 8 to oppose the weight of the shaft and thereby to reduce the bearing pressure resistance between the members 5 and 6.

Having thus described my invention, what I claim and desire to protect by Letters Patent is:

1. A thrust bearing comprising a thrust plate, a relatively fixed retaining member, and an adjustable intermediate bearing member, said members having a closed oil pressure chamber therebetween and said intermediate member having a communicating passage leading from the chamber to the bearing surface between the thrust plate and the intermediate member and means for supplying oil under pressure to said chamber when starting up the bearing whereby both the bearing between said thrust plate and intermediate member and between said intermediate member and said fixed retaining member are lubricated in starting from said oil supply means and after starting from the pressure created at said first named bearing surface.

2. A bearing comprising a thrust plate, a plurality of bearing segments, a supporting member therefor having a spherically curved bottom surface, a base having a correspondingly curved upper surface, at least one of said surfaces having an annular chamber or groove, fluid passages between said bearing segments and chamber, and means for supplying oil under pressure to said chamber when starting up the bearing whereby both the bearing between said thrust plate and bearing segments and between said supporting member and said base are lubricated in starting from said oil supply means and after starting from the pressure created at said bearing segments.

In testimony whereof, I have signed by name to this specification.

ALEXANDER E. SCHEIN.